United States Patent [19]
Goeke

[11] 3,766,632
[45] Oct. 23, 1973

[54] METHOD AND APPARATUS FOR CONNECTING SLEEVES WITH TAPERED INTERNAL THREADS TO PIPES WITH TAPERED EXTERNAL THREADS

[75] Inventor: Alfons Goeke, Solingen, Germany

[73] Assignee: The Kieserling & Albrecht, Solingen, Germany

[22] Filed: May 11, 1972

[21] Appl. No.: 252,180

[30] Foreign Application Priority Data
May 18, 1971  Germany.................. P 21 24 629.7

[52] U.S. Cl........................ 29/428, 29/237, 29/240
[51] Int. Cl..................... B23p 19/00, B23p 19/04
[58] Field of Search ..............29/428, 237, 240

[56] References Cited
UNITED STATES PATENTS

| | | | |
|---|---|---|---|
| 1,562,230 | 11/1925 | Guttly................................. | 29/240 |
| 1,765,825 | 6/1930 | Cork.................................... | 29/240 |
| 1,884,874 | 10/1932 | Ross.................................... | 29/240 |
| 2,322,918 | 6/1943 | Brooke ................................ | 29/240 |
| 3,035,336 | 5/1962 | McConnell .......................... | 29/240 |
| 3,039,181 | 6/1962 | Sawdey................................ | 29/237 |
| 3,662,842 | 5/1972 | Bromell.......................... | 29/428 UX |

Primary Examiner—Charlie T. Moon
Attorney—Michael S. Striker

[57] ABSTRACT

A sleeve having internal threads which taper in a direction away from its open end is screwed onto a pipe having external threads which taper toward one of the pipe ends by placing the sleeve and the pipe into such positions that the axis of the sleeve is parallel to but spaced from the axis of the pipe by half the difference between the maximum thread diameter of the sleeve and the minimum thread diameter of the pipe, by thereupon rotating the sleeve in a direction to screw it onto the pipe, by moving the pipe axially toward the sleeve, and by simultaneously allowing or causing the sleeve to travel sideways so as to move its axis into alignment with the axis of the pipe.

10 Claims, 3 Drawing Figures

United States Patent [19]
Goeke
[11] 3,766,632
[45] Oct. 23, 1973
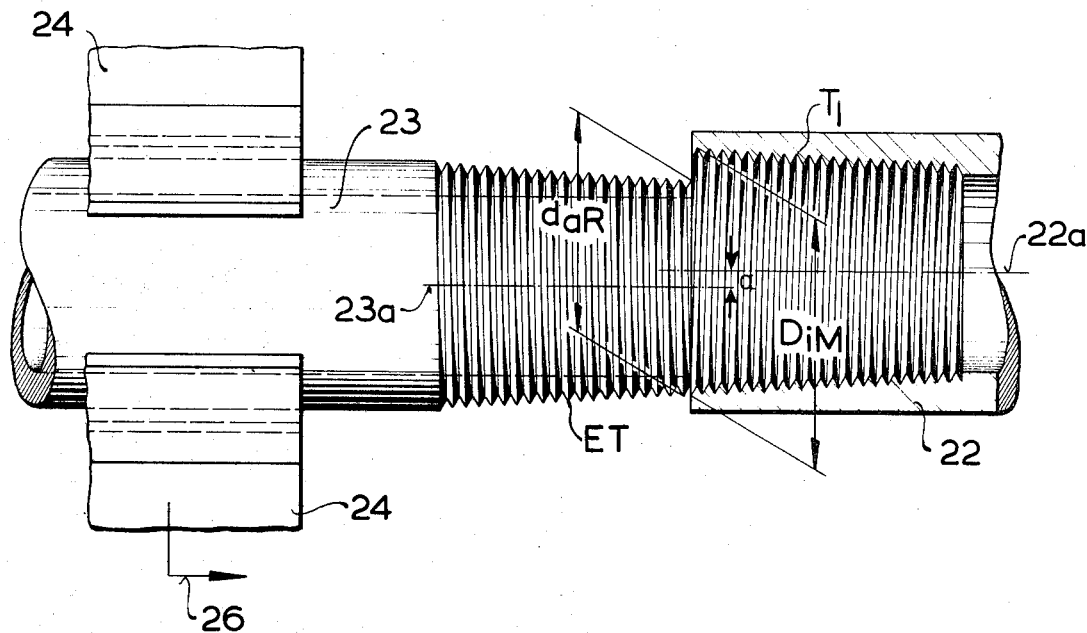

PATENTED OCT 23 1973 3,766,632
SHEET 2 OF 2

METHOD AND APPARATUS FOR CONNECTING SLEEVES WITH TAPERED INTERNAL THREADS TO PIPES WITH TAPERED EXTERNAL THREADS

BACKGROUND OF THE INVENTION

The present invention relates to a method and apparatus for connecting sleeves or analogous workpieces of the type having internal threads which taper inwardly from an open end with pipes, rods or similar workpieces having complementary tapered external threads at one of their ends. Such connections are often necessary to establish a leakproof coupling between pairs of metallic or plastic pipes which are connected to each other by way of a sleeve.

It is already known to use automatic apparatus for connecting sleeves having cylindrical internal threads with pipes which are provided with cylindrical external threads. Reference may be had to German patent No. 472,569. The sleeves are fed to a support to be removed by a transfer mechanism which inserts successive sleeves between the jaws of a rotatable and axially movable first holder. The pipe is fed axially by a second holder while the sleeve in the first holder rotates. The pipe in the second holder is coaxial with the sleeve in the first holder. Such apparatus cannot be used for automatic connection of sleeves having tapered internal threads with pipes having tapered external threads. It was found that the tapered threads are likely to be damaged if the end of a pipe is thrust into a sleeve until the tapered external threads strike against and are arrested by tapered internal threads. On the other hand, there exists an urgent need for an automatic method and apparatus for connecting workpieces with complementary tapered threads, especially for connecting bulky and heavy workpieces which cannot be readily manipulated by hand and which should be connected to each other without any damage to their threads.

SUMMARY OF THE INVENTION

An object of the invention is to provide a novel and improved method of connecting a workpiece having internal threads which taper from one of its ends with a workpiece having complementary external tapered threads in such a way that the workpieces are brought into full mesh without any damage to their threads.

Another object of the invention is to provide a method of rapidly connecting workpieces of the above outlined character in a reproducible way and by resorting to a relatively simple, compact and versatile apparatus.

A further object of the invention is to provide an automatic apparatus for bringing sleeves or analogous workpieces with tapered internal threads into mesh with pipes or analogous workpieces which are provided with complementary external tapered threads.

An additional object of the invention is to provide the apparatus with novel means for moving workpieces prior to and in the course of bringing their complementary internal and external tapered threads into full mesh with each other.

The method of the present invention is resorted to for bringing a first workpiece having external threads which taper toward one of its ends into mesh with a second workpiece having internal threads which taper away from its open end. The method comprises the steps of placing the axes of the workpieces into parallelism with each other so that the end of the first workpiece is adjacent to or even extends into the open end of the second workpiece and the distance between the axes of the two workpieces equals or closely approximates half the difference between the maximum thread diameter of the second workpiece and the minimum thread diameter of the first workpiece whereby a portion of at least one internal thread at the open end of the second workpiece is ready to engage or actually engages a portion of at least one thread at the end of the first workpiece, rotating at least one of the workpieces about its axis in a direction to screw the second workpiece onto the first workpiece, and simultaneously effecting a movement of at least one of the workpieces transversely of the other workpiece to bring the workpieces into axial alignment with each other. At least one of the workpieces is preferably moved axially toward the other workpiece in the course of the rotating step.

The first mentioned step preferably comprises placing the workpieces into parallelism with each other and moving at least one of the workpieces sideways relative to the other workpiece until the end of the first workpiece is adjacent to the open end of the second workpiece and the distance between the axes of the workpieces reaches the aforementioned value. The rotating step may include rotating the second workpiece and holding the first workpiece against rotation.

An advantage of the improved method is that the maximum-diameter internal threads invariably "find" the minimum diameter external threads while the one and/or the other workpiece rotates in a direction to screw the second workpiece onto the first workpiece. This practically eliminates the likelihood of damage to the tapered threads. In the course of the rotating step, the extent to which the internal threads engage with the external threads gradually increases and the two workpieces are brought into full mesh when they reach the positions of exact axial alignment with each other.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
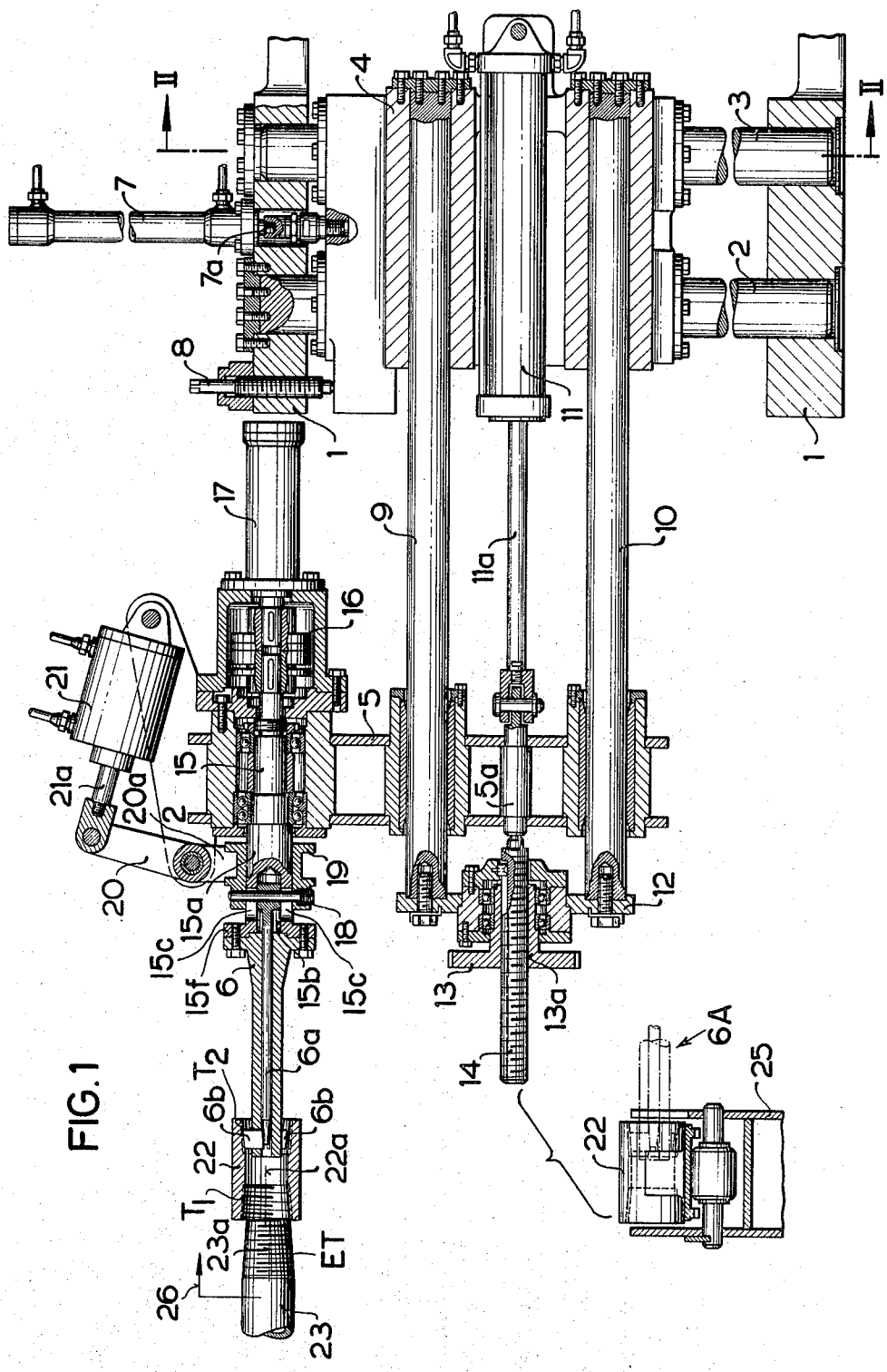
FIG. 1 is a partly side elevational and partly vertical sectional view of an apparatus which embodies the invention.
Figure 2:
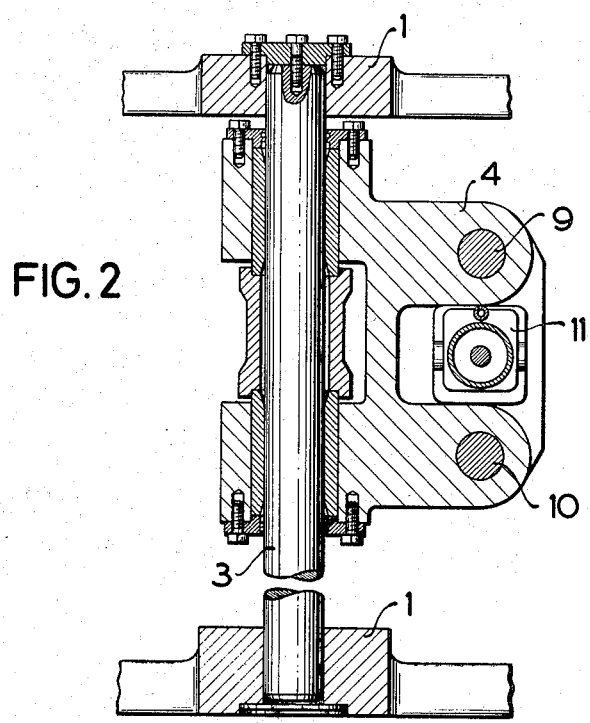
FIG. 2 is a transverse vertical sectional view as seen in the direction of arrows from the line II—II of FIG. 1.

Referring first to FIGS. 1 and 2, the apparatus comprises a frame or housing 1 which includes two upright columns or posts 2, 3 serving to guide a vertically reciprocable support or slide 4 for a carriage 5. The carriage supports a holder 6 for tubular workpieces in the form of sleeves 22 having at least one set of internal threads which taper in a direction inwardly from the respective open end. As shown in FIG. 1, the sleeve 22 which is supported by the holder 6 of the carriage 5 has two sets of internal threads T1 and T2 whereby the threads T1 taper inwardly from the left-hand open end and the threads T2 taper inwardly from the right-hand open end of the sleeve 22. The purpose of the apparatus is to connect the sleeve 22 with a pipe or an analogous workpiece 23 which is held by the jaws 24 (see FIG. 3) of a second holder and is provided with external threads ET which taper in a direction toward the right-hand end of the pipe 22 and must be brought into full mesh with the threads T1 of the sleeve 22.

The slide 4 for the carriage 5 is movable up and down by a fluid-operated cylinder and piston unit 7 having a double-acting cylinder mounted on the frame 1 and a piston rod 7a coupled to the slide 4. When the slide 4 is moved to the upper end position shown in FIG. 1, it abuts against a stop 8 which is adjustable relative to the frame 1. It will be seen that the cylinder and piston unit 7 serves to move the holder 6 for the sleeve 22 transversely of the pipe 23 in the jaws 24 by way of the slide 4 and carriage 5.

The slide 4 supports two parallel horizontal tie rods 9 and 10 whose axes are normal to the axes of the columns 2, 3 and which serve to guide the carriage 5 for movement toward and away from the slide 4. The slide 4 further supports a second fluid-operated cylinder and piston unit 11 having a cylinder secured to the slide 4 and a piston rod 11a which is coupled to the carriage 5. The left-hand end portions of tie rods 9 and 10 are connected to each other by a crosshead or link 12 serving as a means for rotatably supporting a gear 13 which is held against axial movement relative to the crosshead 12. The gear 13 has an axially extending tapped bore 13a which receives a feed screw 14 serving as a stop for the carriage 5. The feed screw 14 is held against rotation so that it automatically moves axially in response to rotation of the gear 13 to thereby determine the extent to which the carriage 5 can move in a direction to the left, as viewed in FIG. 1. The gear 13 meshes with a pinion (not shown) which can be rotated by a hand wheel (not shown) to change the axial position of the feed screw or stop 14.

The upper portion of the carriage 5 supports a rotary shaft 15 which is held against axial movement and can be rotated by an electric motor 17 through the intermediary of a clutch 16. The front or left-hand end portion of the shaft 15 is provided with a flange 15f which is bolted to a flange at the rear end of the holder 6 for the sleeve 22. A shaft portion 15a behind the flange 15f has an axial blind bore 15b for the enlarged rear end portion of a mandrel 6a which is movable in an axial bore of the holder 6. The mandrel 6a is coupled to a ring 19 by means of a diametrically extending pin 18 which is movable in axially parallel slots 15c of the shaft portion 15a. The ring 19 is movable axially of the shaft 15 by a double-acting cylinder 21 having a piston rod 21a which is operatively connected with the ring 19 by means of a link 20. The cylinder 21 is pivotably mounted on the carriage 5. The link 20 has a fork 20a which can move the ring 19 and hence the mandrel 6a axially in response to axial movement of the piston rod 21a.

The front end portion of the holder 6 is provided with radially movable claws 6b which can be spread apart in response to axial movement of the mandrel 6a in a direction to the left, as viewed in FIG. 1, whereby the suitably inclined outer end faces of the claws 6b engage the internal threads T2 of the sleeve 22 with a force which insures that the sleeve 22 will rotate in response to rotation of the shaft 15 but that the claws 6b will not damage the threads T2.

The pipe 23 is held by the jaws 24 of its holder and is movable with such jaws axially toward the holder 6 (see the arrow 26 in FIG. 3) by a mechanism of known design (not shown). Such mechanism may include a fluid-operated cylinder and piston unit whose piston rod constitutes the holder for the pipe 23. The reference character 25 denotes in FIG. 1 a conveyor which serves to deliver successive sleeves 22 into the range of the holder 6 on the carriage 5. When the carriage 5 is moved to (or close to) its lower end postion (by means of the cylinder and piston unit 7), the holder 6 is in register with a sleeve 22 on the conveyor 25 and can move its claws 6b into the interior of such sleeve before the mandrel 6a is moved forwardly in order to move the claws 6b radially outwardly and to thus couple the sleeve 22 on the conveyor 25 with the holder 6.

The Operation:

A fresh pipe 23 is introduced into the space between the jaws 24 of its holder and is held in the axial position shown in FIG. 1. The jaws 24 prevent rotation of the pipe 23 but can move the pipe axially in the direction indicated by the arrow 26. In the meantime, the conveyor 25 delivers a fresh sleeve 22 to the position shown in FIG. 1. The axis 22a of the thus delivered sleeve 22 on the conveyor 25 is then located in a common vertical plane with the axis 23a of the pipe 23 which is held by the jaws 24. The axis of the holder 6 is also located in such vertical plane.

The cylinder and piston unit 7 is then actuated to move the slide 4 downwardly along the columns 2, 3 so that the carriage 5 also descends and moves its holder 6 into axial alignment with the sleeve 22 on the conveyor 25. During such downward movement of the slide 4, the piston rod 11a is fully or nearly fully retracted into the cylinder of the unit 11 on the slide 4 so that the holder 6 can be moved into axial alignment with the sleeve 22 on the conveyor 25. The cylinder of the unit 11 is then actuated to expel the piston rod 11a whereby the carriage 5 moves in a direction to the left, as viewed in FIG. 1, and introduces the claws 6b of the holder 6 into the right-hand end portion of the sleeve 22 on the conveyor 25. The leftward movement of the carriage 5 is terminated when its pin 5a engages the right-hand axial end of the properly adjusted feed screw or stop 14. When the pin 5a engages the feed screw 14, the holder 6 assumes the phantom-line position 6A shown in the lower left-hand portion of FIG. 1.

In the next step, the cylinder 21 on the carriage 5 is actuated to retract its piston rod 21a whereby the link 20 causes the fork 20a to move the ring 19 in a direction to the left and to advance the mandrel 6a toward the conveyor 25 with the result that the claws 6b move apart and properly engage the sleeve 22 which is thereby coupled to the holder 6.

Figure 3:
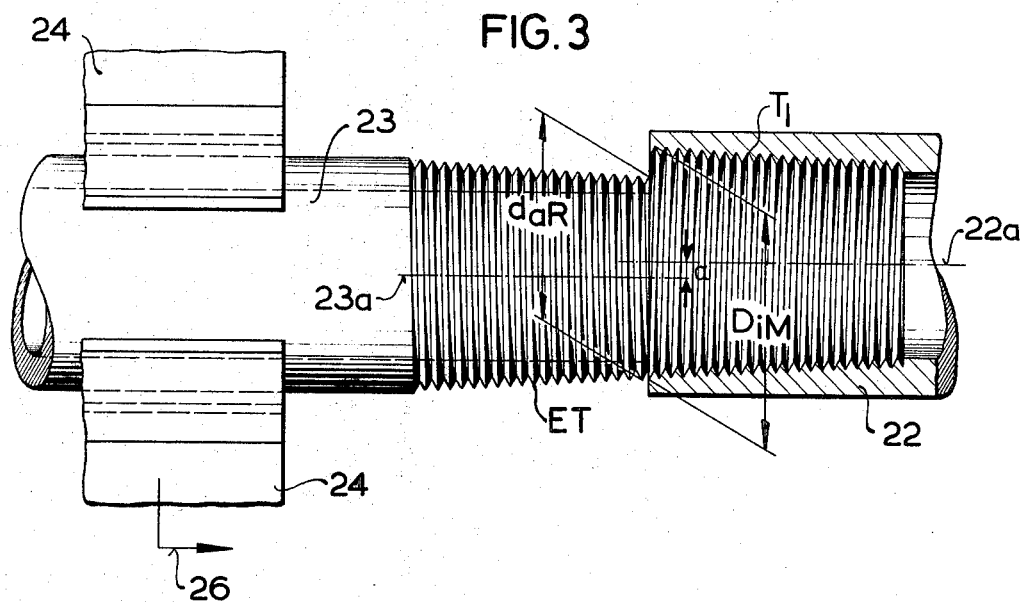
FIG. 3 is an enlarged fragmentary side elevational view of a pipe and its holder and a fragmentary axial sectional view of a sleeve in positions such workpieces assume prior to start of connection to each other.

The cylinder and piston unit 7 is thereupon actuated to move the slide 4 and the carriage 5 upwardly until the slide 4 reaches and is arrested by the adjustable stop 8 on the frame 1. The holder 6 on the carriage 5 then maintains the sleeve 22 in a position as shown in FIG. 3, namely, in a position in which the axes 22a, 23a of the sleeve 22 and pipe 23 are separated from each other by a distance $a$ which equals half the difference maximum internal thread diameter DiM of the sleeve 22 and the minimum external thread diameter daR of the pipe 23. The distance $a$ can be readily selected with a high degree of accuracy by appropriate axial adjustment of the stop 8 for the slide 4.

The motor 17 is thereupon started to rotate the sleeve 22 by way of the holder 6, shaft 15 and clutch 16, and the jaws 24 begin to feed the pipe 22 in the direction indicated by the arrow 26 whereby portions of the rightmost threads ET on the pipe 23 automatically engage portions of the leftmost threads T1 in the rotating sleeve 22. The axially advancing pipe 23 causes the rotating sleeve 22 to move sideways (downwardly, as viewed in FIG. 1) against the opposition of pressurized fluid in the lower chamber of the cylinder in the unit 7, and such sidewise movement of the sleeve 22 is terminated when the sleeve reaches a position of axial alignment with the pipe 23 in the jaws 24.

The clutch 16 may be a friction clutch or a clutch which can transmit torque up to a predetermined maximum value so that the shaft 15 is arrested while the motor 17 continues to rotate its output element as soon as the screwing of the sleeve 22 onto the pipe 23 is completed. Such construction of the clutch 16 reduces the likelihood of damage to the motor 17 if the motor is not arrested at the exact moment when the screwing of the sleeve 22 onto the pipe 23 is completed. The shaft 15 can be directly coupled with the output shaft of a pneumatic motor (if such pneumatic motor is used as a substitute for the electric motor 17 of FIG. 1) because the torque which a pneumatic motor can deliver can be readily limited by appropriate control of the pressure of pneumatic operating fluid.

When the screwing of the sleeve 22 onto the pipe 23 is completed, the cylinder 21 on the carriage 5 expels its piston rod 21a so that the fork 20a retracts the ring 19 and the mandrel 6a with the result that the claws 6b are disengaged from the sleeve 22. The cylinder of the unit 11 is thereupon caused to retract its piston rod 11a so that the carriage 5 moves in a direction to the right, as viewed in FIG. 1, and the holder 6 is separated from the sleeve 22 on the pipe 23. This pipe is thereupon replaced with a fresh pipe and the conveyor 25 delivers a fresh sleeve whereby the apparatus is ready for the next operation.

The unit 7 can be operated with a gaseous fluid which enables the sleeve 22 on the holder 6 to move sideways while the pipe 23 in the jaws 24 moves in the direction indicated by the arrow 26. However, it is equally possible to employ a hydraulically operated cylinder and piston unit 7 if the fluid which is entrapped in the lower chamber of the cylinder is allowed to escape while the sleeve 22 moves sideways during screwing onto a pipe 23 in the jaws 24. The operation of the parts 7, 11, 17 and 21 can be started and terminated by a suitable programming system, not shown.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A method of bringing a first workpiece having external threads which taper toward one end thereof into mesh with a second workpiece having internal threads which taper away from an open end thereof, comprising the steps of placing the axes of the workpieces into parallelism with each other so that the distance between said axes equals half the difference between the maximum thread diameter of the second workpiece and the minimum thread diameter of the first workpiece; rotating at least one of the workpieces about its axis in a direction to screw the second workpiece onto the first workpiece; and simultaneously effecting a movement of at least one of the workpieces transversely of the other workpiece to bring the workpieces into axial alignment with each other.

2. A method as defined in claim 1, further comprising the step of moving one of said workpieces axially toward the other workpiece in the course of said rotating step.

3. A method as defined in claim 1, wherein said first mentioned step comprises placing the workpieces into parallelism with each other, and moving at least one of the workpieces transversely of the other workpiece until the distance between the axes of the workpieces reaches said first mentioned distance.

4. A method as defined in claim 1, wherein the first workpiece is a pipe and the second workpiece is a sleeve.

5. A method as defined in claim 1, wherein said rotating step includes rotating the second workpiece and holding the first workpiece against rotation.

6. Apparatus for bringing first workpieces each having external threads which taper toward one end thereof into mesh with second workpieces each having internal threads which taper away from an open end thereof, comprising a first holder arranged to engage and hold a first workpiece in a predetermined position; a second holder arranged to engage and hold a second workpiece in a second predetermined position in which the workpiece held by said first holder is parallel with the workpiece held by said second holder; means for moving at least one of said holders sideways so as to move the respective workpiece to a position in which the axes of the workpieces held by said holders are separated from each other by a distance equaling half the difference between the maximum internal thread diameter of the workpiece held by said second holder and the minimum external thread diameter of the workpiece held by said first holder; means for rotating at least one of said holders in a direction to screw the workpiece held by said second holder onto the workpiece held by said first holder with attendant sidewise movement of at least one of said holders in a direction to place the workpieces held by said holders into axial alignment with each other; and means for yieldably opposing said last mentioned sidewise movement.

7. Apparatus as defined in claim 6, wherein said opposing means constitutes said means for moving one of said holders sideways.

8. Apparatus as defined in claim 7, wherein said opposing means comprises a fluid-operated cylinder and piston unit.

9. Apparatus as defined in claim 6, further comprising a carriage for supporting said second holder, frame means supporting said carriage for movement in a first direction which is parallel to the axis of a workpiece held by said second holder and in a second direction at right angles to said first direction, said opposing means including a fluid operated cylinder and piston unit mounted on said frame means and connected to said carriage to move the latter with said second holder in said second direction for placing of the workpiece held by said second holder into said second predetermined position and to oppose the sidewise movement of said second holder during screwing of the workpiece held by said second holder onto the workpiece held by said first holder.

10. Apparatus as defined in claim 9, wherein said means for rotating is mounted on said carriage and is operatively connected with said second holder.

* * * * *

UNITED STATES PATENT OFFICE
CERTIFICATE OF CORRECTION

Patent No. 3,766,632         Dated October 23, 1973

Inventor(s) Alfons Goeke

It is certified that error appears in the above-identified patent and that said Letters Patent are hereby corrected as shown below:

On the cover sheet item [73] "The Kieserling & Albrecht" should read -- TH. KIESERLING & ALBRECHT --.

Signed and sealed this 2nd day of April 1974.

(SEAL)
Attest:

EDWARD M. FLETCHER, JR.　　　　　　C. MARSHALL DANN
Attesting Officer　　　　　　　　　　Commissioner of Patents